US009523325B2

(12) United States Patent
Koo

(10) Patent No.: US 9,523,325 B2
(45) Date of Patent: Dec. 20, 2016

(54) METHOD AND SYSTEM FOR DIAGNOSING FAILURE OF A GASOLINE DIRECT INJECTION ENGINE

(71) Applicant: Hyundai Motor Company, Seoul (KR)

(72) Inventor: Bon-Chang Koo, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 239 days.

(21) Appl. No.: 14/313,675

(22) Filed: Jun. 24, 2014

(65) Prior Publication Data

US 2015/0167579 A1  Jun. 18, 2015

(30) Foreign Application Priority Data

Dec. 17, 2013  (KR) .................. 10-2013-0157588

(51) Int. Cl.
| G01M 15/04 | (2006.01) |
| F02D 41/38 | (2006.01) |
| F02D 41/22 | (2006.01) |
| F02D 41/30 | (2006.01) |
| F02B 75/12 | (2006.01) |

(52) U.S. Cl.
CPC ............... *F02D 41/38* (2013.01); *F02D 41/22* (2013.01); *F02D 41/221* (2013.01); *F02D 41/222* (2013.01); *F02D 41/3082* (2013.01); *F02D 41/3854* (2013.01); *F02B 2075/125* (2013.01); *F02D 2041/224* (2013.01); *F02D 2041/389* (2013.01); *Y02T 10/123* (2013.01)

(58) Field of Classification Search
USPC ............. 73/114.38, 114.41, 114.42, 114.43, 73/114.45, 114.46, 114.47, 114.48, 114.49, 73/114.51
See application file for complete search history.

(56) References Cited

U.S. PATENT DOCUMENTS

| 5,755,198 A | 5/1998 | Grob et al. | |
| 6,763,713 B2* | 7/2004 | Kim | ...... F02D 33/003 |
| | | | 702/55 |
| 7,021,117 B2* | 4/2006 | Cho | ...... G01F 25/0061 |
| | | | 73/1.73 |
| 7,127,940 B2* | 10/2006 | Shin | ...... F02M 65/00 |
| | | | 73/114.72 |
| 2002/0148441 A1* | 10/2002 | Tuken | ...... F02D 41/0085 |
| | | | 123/436 |
| 2010/0242582 A1* | 9/2010 | Wang | ...... F02D 41/0082 |
| | | | 73/114.62 |

(Continued)

FOREIGN PATENT DOCUMENTS

| JP | 2009-114919 A | 5/2009 |
| JP | 2009-191778 A | 8/2009 |

(Continued)

*Primary Examiner* — Eric S McCall
(74) *Attorney, Agent, or Firm* — Morgan, Lewis & Bockius LLP

(57) ABSTRACT

Disclosed are a method and a system for diagnosing failure of a gasoline direct injection (GDI) engine that can diagnose a device (or part) causing failure through forcible driving control of a related device (or part) when failure occurs in the GDI engine. The method for diagnosing failure of a GDI engine may include verifying whether a failure code is output from an engine control unit that controls the engine, and diagnosing whether a fuel system device is in a failure state by forcibly driving the fuel system device of the engine with a set control value when the failure code is output from the engine control unit.

10 Claims, 5 Drawing Sheets

(56) References Cited

U.S. PATENT DOCUMENTS

| | | | | |
|---|---|---|---|---|
| 2012/0143475 A1* | 6/2012 | Ryoo | ................ | F02D 41/065 |
| | | | | 701/103 |
| 2014/0060160 A1* | 3/2014 | Pursifull | ............. | G01M 15/09 |
| | | | | 73/40 |
| 2014/0074385 A1* | 3/2014 | Dudar | ............... | F02M 25/0818 |
| | | | | 701/113 |

FOREIGN PATENT DOCUMENTS

| KR | 2001-0071100 A | 7/2001 |
|---|---|---|
| KR | 10-2011-0054469 A | 5/2011 |

* cited by examiner

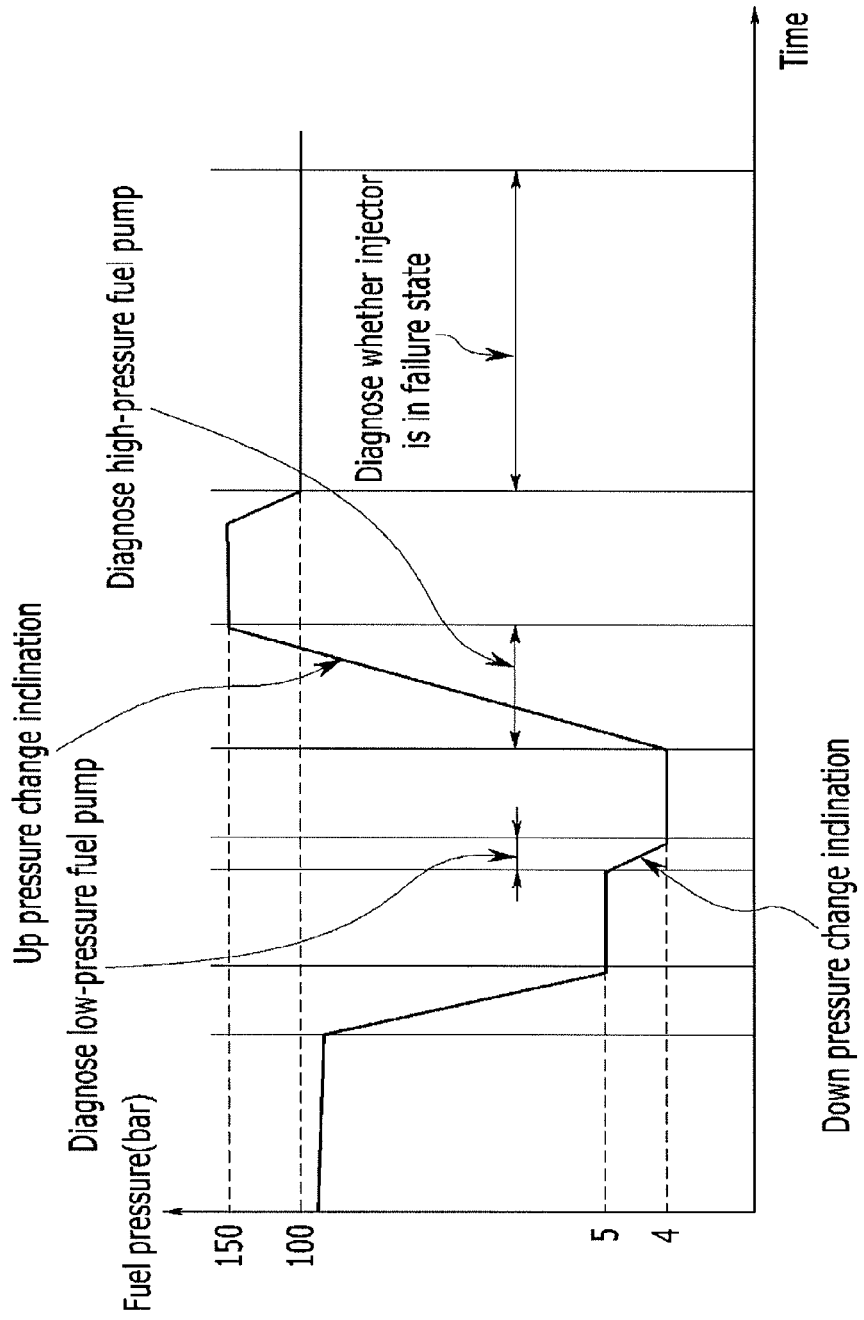

METHOD AND SYSTEM FOR DIAGNOSING FAILURE OF A GASOLINE DIRECT INJECTION ENGINE

CROSS-REFERENCE TO RELATED APPLICATION

The present application claims priority of Korean Patent Application Number 10-2013-0157588 filed on Dec. 17, 2013, the entire contents of which application are incorporated herein for all purposes by this reference.

BACKGROUND OF INVENTION

Field of Invention

The present invention relates to a method and a system for diagnosing failure of a gasoline direct injection (GDI) engine that diagnoses failure of a gasoline direct injection engine directly injecting fuel into a combustion chamber.

Description of Related Art

A gasoline direct injection (GDI) engine as a gasoline engine that directly injects fuel into a combustion chamber boosts fuel, which is supplied from a low-pressure fuel pump installed in a fuel tank, in a high-pressure fuel pump again and supplies the boosted fuel to an injector, in order to directly inject the fuel into the combustion chamber.

The gasoline direct injection engine is combined with a high-pressure system constituted by a high-pressure control valve, a high-pressure fuel pump, a fuel pressure sensor, and an injector; and a low-pressure system constituted by a low-pressure fuel pump, a fuel pump controller, and a fuel pressure sensor, thereby forming a GDI engine system.

In the GDI engine system, since fuel needs to be injected into the combustion chamber at high pressure, a fuel supply system further pressurizes fuel, which is primarily pressurized by the low-pressure system, in the high-pressure system. The fuel pressurized by the high-pressure system is directly injected into the combustion chamber through the injector.

In the GDI engine, problems such as an output shortage, excessive fuel consumption, and the like are caused when failure occurs in parts of a fuel system, and a result, the type of failure needs to be diagnosed.

One example of the existing GDI engine failure diagnosis (test) includes an evaporative leak test of judging whether which part of an evaporation system is in a failure state by measuring pressure in a fuel tank by controlling a purge valve with control logic of an engine control unit (ECU), when it is doubted that failure occurs in parts of the evaporation system of the GDI engine.

Further, part causing failure may be found by sensing a change in pressure in the tank by installing a fuel pressure sensor in the fuel tank.

However, in the case of the existing GDI engine, when failure occurs due to abnormal performance of the parts, not disconnection and a short-circuit, the engine control unit expresses only a failure code such as "low pressure to target pressure" or "high pressure to target pressure", and as a result, a cause part (device) causes a phenomenon of not knowing what is the exact problem.

Therefore, in the related art, since the injector, the pump, the pressure sensor, and the like, which are fuel parts of the GDI engine, are arbitrarily replaced, the same problem may reoccur.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a method and a system for diagnosing failure in a GDI engine that can diagnose a device (part) causing failure through forcible driving control of a related device (part) when a failure occurs in the GDI engine, prevent reoccurrence of the failure, and rapidly repair a failure causing device (part).

Various aspects of the present invention provide a method for diagnosing failure of a gasoline direct injection (GDI) engine including: verifying whether a failure code is output from an engine control unit (ECU) that controls the engine; and diagnosing whether a fuel system device is in a failure state by forcibly driving the fuel system device of the engine with a set control value if the failure code is output from the engine control unit.

The fuel system device may include a fuel pressure sensor, a low-pressure fuel pump, a high-pressure fuel pump, and/or an injector.

The method may further include: controlling down pressure of the low-pressure fuel pump until the pressure of the low-pressure fuel pump reaches first set down pressure (e.g., 5 bar) if the failure code is output from the engine control unit; diagnosing that the fuel pressure sensor is normal if the pressure of the low-pressure fuel pump becomes the first set down pressure; additionally controlling down the pressure of the low-pressure fuel pump until the pressure of the low-pressure fuel pump becomes second set down pressure (e.g., 4 bar); calculating a change inclination from the first set down pressure to the second set down pressure if the pressure of the low-pressure fuel pump becomes the second set down pressure; and diagnosing that the low-pressure fuel pump is normal if the change inclination is within a set value range (e.g., 1 to 10) and diagnosing that the low-pressure fuel pump is in the failure state if the change inclination is not within the set value range.

The method may further include diagnosing that the fuel pressure sensor is in the failure state if the pressure of the low-pressure fuel pump does not become the first set down pressure even though a down pressure control time of the low-pressure fuel pump is more than a set time (e.g., 10 to 60 sec.).

The method may further include: controlling the high-pressure fuel pump with a set target maximum pressure value (e.g., 150 bar); calculating an up pressure change inclination until pressure of the high-pressure fuel pump becomes the target maximum pressure value if the pressure of the high-pressure fuel pump becomes the target maximum pressure value; and diagnosing that the high-pressure fuel pump is normal if the up pressure change inclination is within a set value range (e.g., 1 to 10) and diagnosing that the high-pressure fuel pump is in the failure state if the up pressure change inclination is not within the set value range.

The method may further include: prohibiting an operation of the injector; verifying misfire in a cylinder corresponding to the injector after preventing the operation of the injector; and diagnosing that the injector is normal if the misfire occurs in the cylinder and diagnosing that the injector is in the failure state if no misfire occurs in the cylinder.

The diagnosing of whether the fuel system device is in the failure state may be performed sequentially in the order of the fuel pressure sensor, the low-pressure fuel pump, the high-pressure fuel pump, and the injector.

Various other aspects of the present invention provide a system for diagnosing failure of a gasoline direct injection (GDI) engine, including: an engine control unit (ECU) configured to control the engine; a low-pressure fuel pump configured to primarily pressurize gasoline fuel of a fuel tank; a high-pressure fuel pump configured to secondarily pressurize the fuel pressurized by the low-pressure fuel pump; an injector configured to directly inject the fuel pressurized by the high-pressure fuel pump into a combustion chamber of the engine; a fuel pressure sensor configured to detect fuel pressures of the low-pressure fuel pump and the high-pressure fuel pump; and a failure diagnoser configured to diagnose whether the fuel pressure sensor, the low-pressure fuel pump, the high-pressure fuel pump, and/or the injector are in a failure state if a failure code is output from the engine control unit, in which the failure diagnoser may execute a command for performing the method for diagnosing failure in a GDI engine of the present invention.

According to various aspects of the present invention, when failure occurs in a GDI engine, a device (part) that causes the failure can be diagnosed by a forcible driving control of a related device (part), and as a result, reoccurrence of the failure can be prevented and the failure causing device (part) can be rapidly repaired.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a graph for describing operations of an exemplary method and an exemplary system for diagnosing failure of a GDI engine according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, in the specification, unless explicitly described to the contrary, the word "comprise" and variations such as "comprises" or "comprising", will be understood to imply the inclusion of stated elements but not the exclusion of any other elements.

Figure 1:
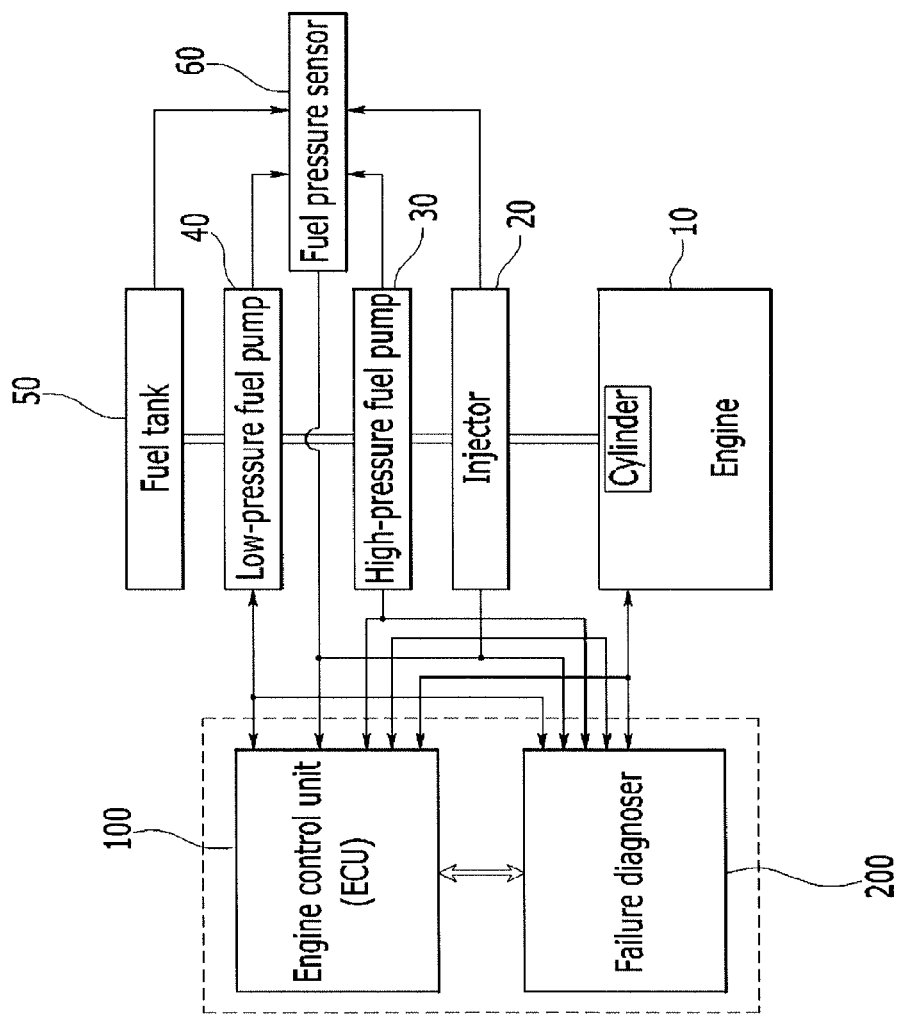
FIG. 1 is a configuration diagram of an exemplary system for diagnosing failure of a GDI engine according to the present invention.

FIG. 1 is a block configuration diagram illustrating a system for diagnosing failure of a GDI engine according to various embodiments of the present invention. The system for diagnosing failure of a GDI engine according to various embodiments of the present invention is a failure diagnosing system that diagnoses and verifies a device or a part which causes the failure of the GDI engine.

The system for diagnosing failure of a GDI engine according to various embodiments of the present invention may include an engine control unit (ECU) 100 for generally controlling a GDI engine 10 (hereinafter, abbreviated as an 'engine'); a low-pressure fuel pump 40 for primarily pressurizing gasoline fuel of a fuel tank 50; a high-pressure fuel pump 30 for secondarily pressurizing the fuel pressurized by the low-pressure fuel pump 40; an injector 20 for directly injecting the fuel pressurized by the high-pressure fuel pump 30 into a combustion chamber of the engine 10; a fuel pressure sensor 60 for detecting fuel pressures of the low-pressure fuel pump 40 and the high-pressure fuel pump 50; and a failure diagnoser 200 for diagnosing whether the fuel pressure sensor 60, the low-pressure fuel pump 40, the high-pressure fuel pump 30, and/or the injector 20 are in a failure state when a failure code is output from the engine control unit 100.

In various embodiments of the present invention, the engine 10, the ECU 100, the fuel tank 50, the low-pressure fuel pump 40, the high-pressure fuel pump 30, the injector 20, and/or the fuel pressure sensor 60 may be the same as or similar to those used in the related art, and thus a detailed description thereof will be omitted.

The failure code output from the ECU 100 may be the same as or similar to those used in the related art.

The failure diagnoser 200 is a hardware including one or more microprocessors and/or microprocessors that operate by a set program, and the set program may be formed of a series of commands for performing a method for diagnosing failure in a GDI engine according to various embodiments of the present invention, which will be described below.

In various embodiments of the present invention, the failure diagnoser 200 may be independently configured, and further, may be configured to include the ECU 100 in consideration of a design aspect or to be included in the ECU 100.

Hereinafter, a method for diagnosing failure in a GDI engine according to various embodiments of the present invention will be described in detail with reference to the accompanying drawings.

Figure 2:
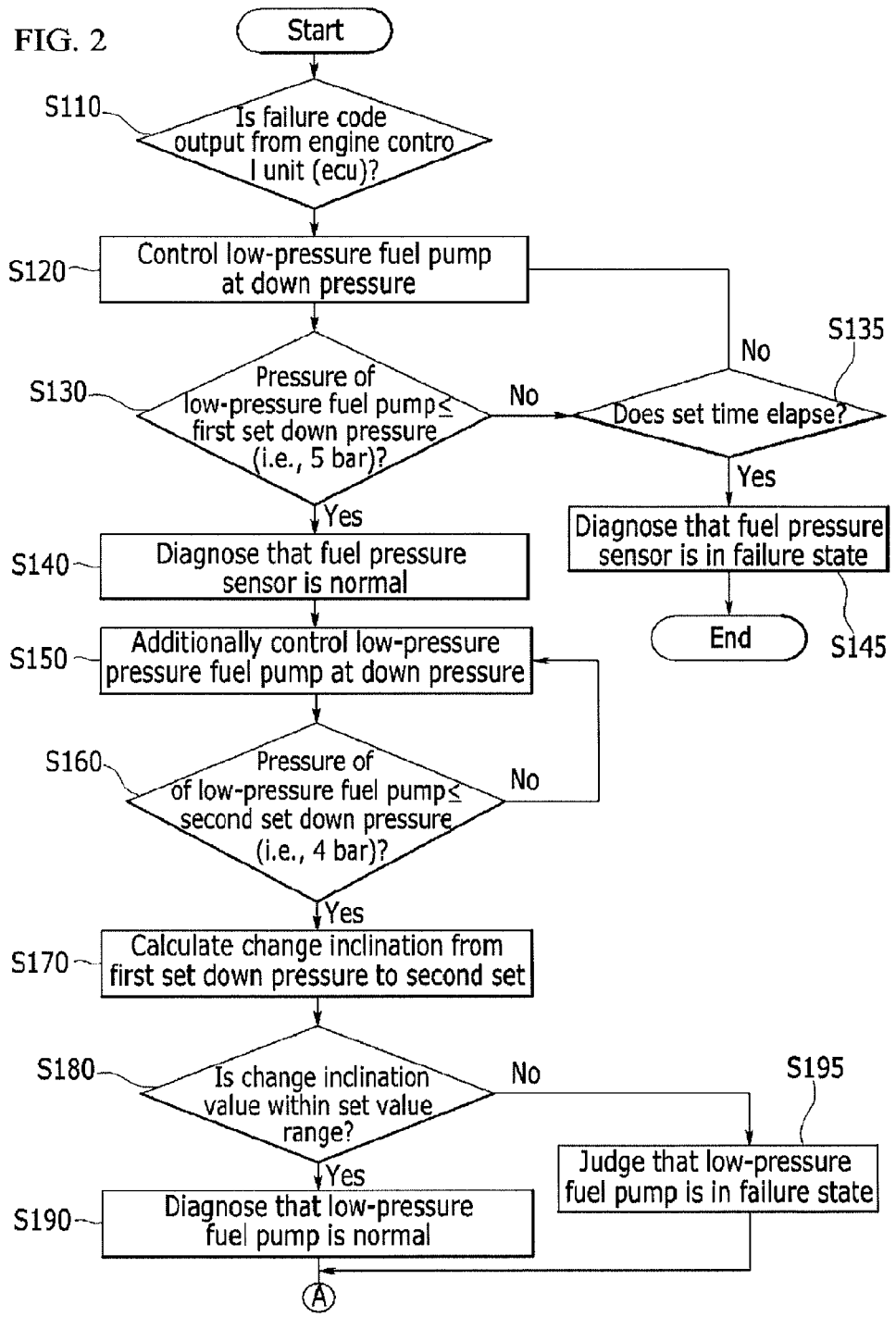
FIGS. 2 to 4 are flowcharts of an exemplary method for diagnosing failure of a GDI engine according to the present invention.
Figure 3:
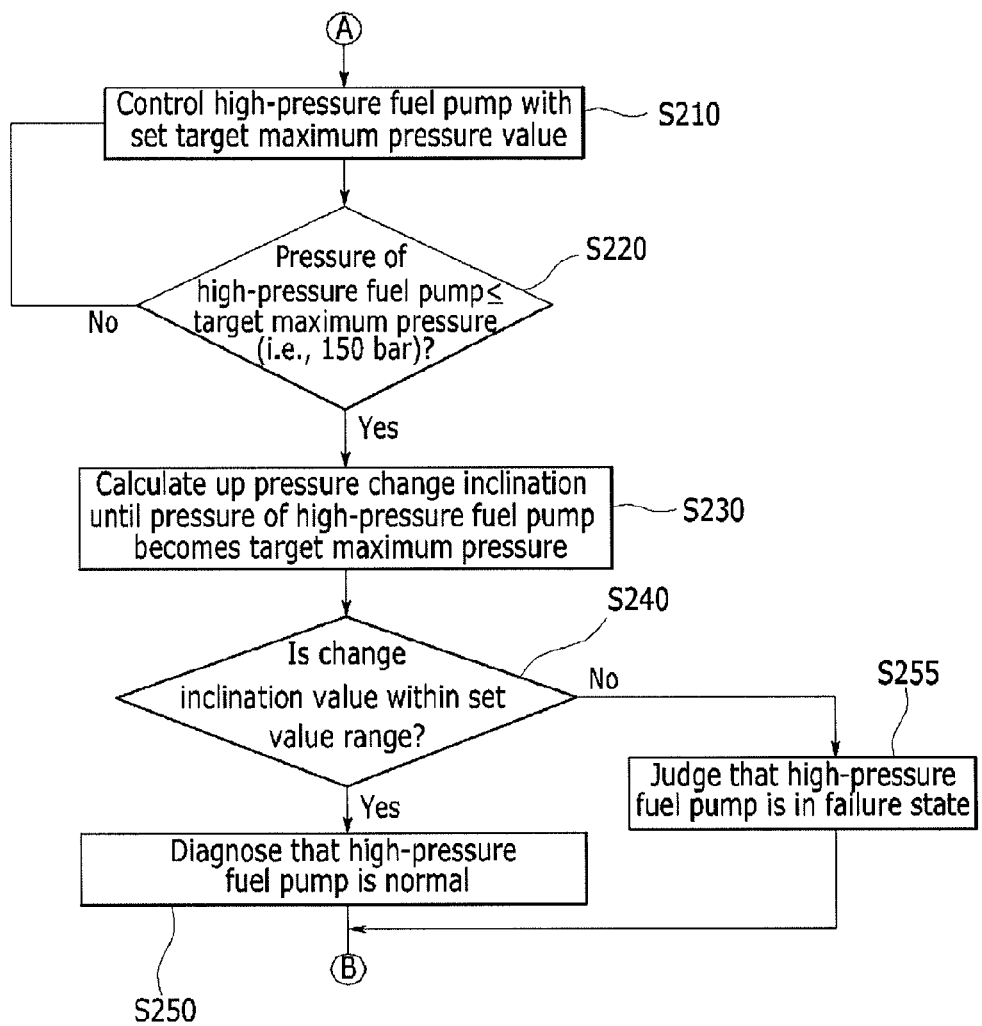
Figure 4:
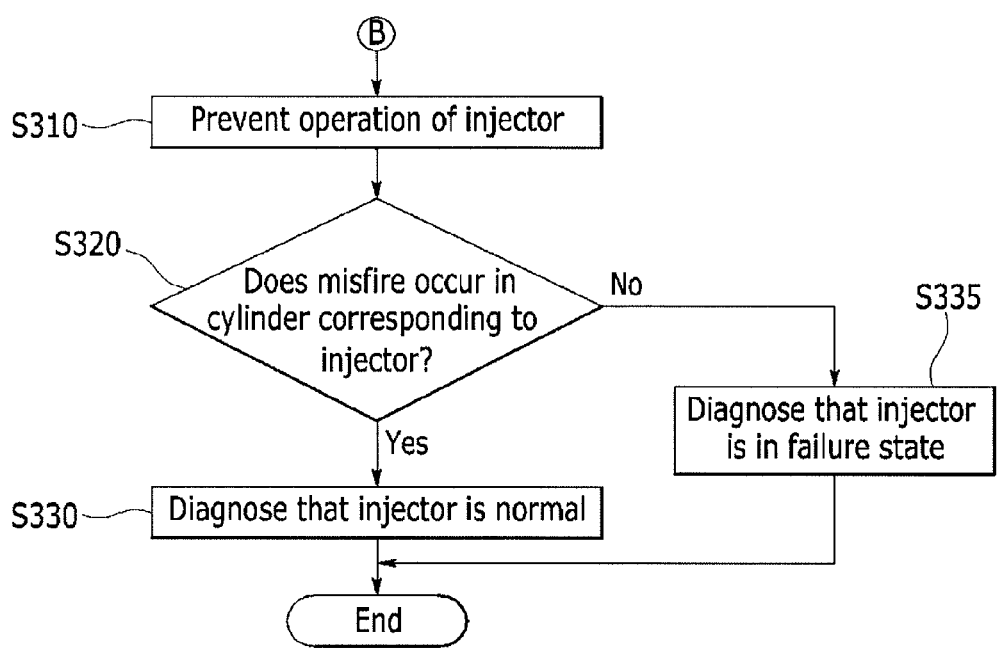

FIG. 2 is a flowchart illustrating a method for diagnosing failure in a fuel pressure sensor and a low-pressure fuel pump of a GDI engine according to various embodiments of the present invention. FIG. 3 is a flowchart illustrating a method for diagnosing failure in a high-pressure fuel pump of a GDI engine according to various embodiments of the present invention. FIG. 4 is a flowchart illustrating a method for diagnosing failure in an injector of a GDI engine according to various embodiments of the present invention.

As illustrated in FIG. 2, the failure diagnoser 200 performs a down pressure control until the low-pressure fuel pump 40 becomes first set down pressure (e.g., 5 bar) when the failure code is output from the ECU 100 ((S110), (S120), and (S130)).

The failure code output from the ECU 100 may be the same as or similar to those used in the related art.

When the pressure of the low-pressure fuel pump 40 becomes the first set down pressure, the failure diagnoser 200 judges that the fuel pressure sensor 60 normally detects the first set down pressure, thereby diagnosing that the fuel pressure sensor 60 is normal (S140).

The failure diagnoser 200 diagnoses that the fuel pressure sensor 60 is normal and thereafter, additionally performs the down pressure control until the pressure of the low-pressure fuel pump 40 becomes second set down pressure (e.g., 4 bar) (S150).

When the pressure of the low-pressure fuel pump 40 becomes the second set down pressure (S160), the failure diagnoser 200 calculates a change inclination from the first set down pressure to the second down pressure (S170 and illustrated in FIG. 5).

When the change inclination calculated in step S170 is within a set value range (e.g., 1 to 10) (S180), the failure diagnoser 200 judges that the low-pressure fuel pump 40 normally operates, so as to diagnose that the low-pressure fuel pump 40 is normal (S190), and when the change inclination is not within the set value range, diagnoses that the low-pressure fuel pump 40 is in a failure state (S195). The set value range may be determined according to a design aspect and/or a test value.

Meanwhile, although a down pressure control time of the low-pressure fuel pump 40 is more than a set time (e.g., 10 to 60 sec.), when the pressure of the low-pressure fuel pump 40 does not become the first set down pressure, the failure diagnoser 200 may diagnose that the fuel pressure sensor 60 is in the failure state ((S135) and (S145)). The set value range may be determined according to a design aspect and/or a test value.

Referring to FIG. 3, the failure diagnoser 200 diagnoses the low-pressure fuel pump 40 and thereafter, controls the high-pressure fuel pump 30 to a set target maximum pressure value (e.g., 150 bar) for diagnosing the high-pressure fuel pump 30 (S210).

When the pressure of the high-pressure fuel pump 30 becomes the target maximum pressure value according to the control of the failure diagnoser 200 (S220), the failure diagnoser 200 calculates an up pressure change inclination until the pressure of the high-pressure fuel pump 30 becomes the target maximum pressure value (S230 and illustrated in FIG. 5).

When the calculated up pressure change inclination is within the set value range (e.g., 1 to 10) (S240), the failure diagnoser 200 judges that the high-pressure fuel pump 30 normally operates, so as to diagnose that the high-pressure fuel pump 30 is normal (S250), and when the calculated up pressure change inclination is not within the set value range, diagnose that the high-pressure fuel pump 30 is in the failure state (S255). The set value range may be determined according to a design aspect and/or a test value.

Referring to FIG. 4, the failure diagnoser 200 diagnoses the high-pressure fuel pump 30 and thereafter, prohibits an operation of the injector 20 in order to diagnose the injector 20 (S310). After the operation of the injector 20 is prevented, the failure diagnoser 200 verifies whether misfire occurs in a cylinder corresponding to the injector 20 (S320).

As a result of verifying whether the misfire occurs in step S320, when the misfire occurs in the cylinder, the failure diagnoser 200 diagnoses that the injector 200 is normal (S330), and since the injector 20 abnormally operates when no misfire occurs in the cylinder, the failure diagnoser 200 diagnoses that the injector 20 is in a failure state (S335).

As described above, the failure diagnoser 200 sequentially performs whether the fuel system device is in the failure state, in the order of the fuel pressure sensor 60, the low-pressure fuel pump 40, the high-pressure fuel pump 30, and the injector 20.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for diagnosing failure of a gasoline direct injection (GDI) engine, comprising:
    verifying whether a failure code is output from an engine control unit that controls the engine; and
    diagnosing whether a fuel system is in a failure state by forcibly driving the fuel system of the engine with a set control value when the failure code is output from the engine control unit,
    wherein the fuel system includes a fuel pressure sensor, a low-pressure fuel pump, a high-pressure fuel pump and an injector, and
    wherein the diagnosing whether the fuel system is in the failure state comprises:
        controlling down pressure of the low-pressure fuel pump until the pressure of the low-pressure fuel pump reaches first set down pressure if the failure code is output from the engine control unit;
        diagnosing that the fuel pressure sensor is normal if the pressure of the low-pressure fuel pump becomes the first set down pressure;
        additionally controlling down the pressure of the low-pressure fuel pump until the pressure of the low-pressure fuel pump becomes second set down pressure;
        calculating a change inclination from the first set down pressure to the second set down pressure if the pressure of the low-pressure fuel pump becomes the second set down pressure; and
        diagnosing that the low-pressure fuel pump is normal if the change inclination is within a set value range and diagnosing that the low-pressure fuel pump is in the failure state if the change inclination is not within a set value range.

2. A system for diagnosing failure of a gasoline direct injection (GDI) engine, comprising:
    an engine control unit (ECU) configured to control the engine;
    a low-pressure fuel pump configured to primarily pressurize gasoline fuel of a fuel tank;
    a high-pressure fuel pump configured to secondarily pressurize the fuel pressurized by the low-pressure fuel pump;
    an injector configured to directly inject the fuel pressurized by the high-pressure fuel pump into a combustion chamber of the engine;
    a fuel pressure sensor configured to detect fuel pressures of the low-pressure fuel pump and the high-pressure fuel pump; and
    a failure diagnoser configured to diagnose whether the fuel pressure sensor, the low-pressure fuel pump, the high-pressure fuel pump, and/or the injector are in a failure state if a failure code is output from the engine control unit,
    wherein the failure diagnoser executes a command for performing the method of claim 1.

3. The method of claim 1, wherein the diagnosing whether the fuel system is in the failure state further comprises:

diagnosing that the fuel pressure sensor is in the failure state if the pressure of the low-pressure fuel pump does not become the first set down pressure even though a down pressure control time of the low-pressure fuel pump is more than a set time.

4. A system for diagnosing failure of a gasoline direct injection (GDI) engine, comprising:

an engine control unit (ECU) configured to control the engine;

a low-pressure fuel pump configured to primarily pressurize gasoline fuel of a fuel tank;

a high-pressure fuel pump configured to secondarily pressurize the fuel pressurized by the low-pressure fuel pump;

an injector configured to directly inject the fuel pressurized by the high-pressure fuel pump into a combustion chamber of the engine;

a fuel pressure sensor configured to detect fuel pressures of the low-pressure fuel pump and the high-pressure fuel pump; and a failure diagnoser configured to diagnose whether the fuel pressure sensor, the low-pressure fuel pump, the high-pressure fuel pump, and/or the injector are in a failure state if a failure code is output from the engine control unit, wherein the failure diagnoser executes a command for performing the method of claim 3.

5. A method for diagnosing failure of a gasoline direct injection (GDI) engine, comprising:

verifying whether a failure code is output from an engine control unit that controls the engine; and diagnosing whether a fuel system is in a failure state by forcibly driving the fuel system of the engine with a set control value when the failure code is output from the engine control unit, wherein the fuel system includes a fuel pressure sensor, a low-pressure fuel pump, a high-pressure fuel pump and an injector, and wherein the diagnosing whether the fuel system is in the failure state comprises:

controlling the high-pressure fuel pump with a set target maximum pressure value;

calculating an up pressure change inclination until pressure of the high-pressure fuel pump becomes the target maximum pressure value if the pressure of the high-pressure fuel pump becomes the target maximum pressure value; and diagnosing that the high-pressure fuel pump is normal if the up pressure change inclination is within a set value range and diagnosing that the high-pressure fuel pump is in the failure state if the up pressure change inclination is not within the set value range.

6. A system for diagnosing failure of a gasoline direct injection (GDI) engine, comprising:

an engine control unit (ECU) configured to control the engine;

a low-pressure fuel pump configured to primarily pressurize gasoline fuel of a fuel tank;

a high-pressure fuel pump configured to secondarily pressurize the fuel pressurized by the low-pressure fuel pump;

an injector configured to directly inject the fuel pressurized by the high-pressure fuel pump into a combustion chamber of the engine;

a fuel pressure sensor configured to detect fuel pressures of the low-pressure fuel pump and the high-pressure fuel pump; and a failure diagnoser configured to diagnose whether the fuel pressure sensor, the low-pressure fuel pump, the high-pressure fuel pump, and/or the injector are in a failure state if a failure code is output from the engine control unit, wherein the failure diagnoser executes a command for performing the method of claim 5.

7. A method for diagnosing failure of a gasoline direct injection (GDI) engine, comprising:

verifying whether a failure code is output from an engine control unit that controls the engine; and diagnosing whether a fuel system is in a failure state by forcibly driving the fuel system of the engine with a set control value when the failure code is output from the engine control unit wherein the fuel system includes a fuel pressure sensor, a low-pressure fuel pump, a high-pressure fuel pump and an injector, and wherein the diagnosing whether the fuel system is in the failure state comprises:

preventing an operation of the injector;

verifying misfire in a cylinder corresponding to the injector after preventing the operation of the injector; and diagnosing that the injector is normal if the misfire occurs in the cylinder and diagnosing that the injector is in the failure state if no misfire occurs in the cylinder.

8. A system for diagnosing failure of a gasoline direct injection (GDI) engine, comprising:

an engine control unit (ECU) configured to control the engine;

a low-pressure fuel pump configured to primarily pressurize gasoline fuel of a fuel tank;

a high-pressure fuel pump configured to secondarily pressurize the fuel pressurized by the low-pressure fuel pump;

an injector configured to directly inject the fuel pressurized by the high-pressure fuel pump into a combustion chamber of the engine;

a fuel pressure sensor configured to detect fuel pressures of the low-pressure fuel pump and the high-pressure fuel pump; and a failure diagnoser configured to diagnose whether the fuel pressure sensor, the low-pressure fuel pump, the high-pressure fuel pump, and/or the injector are in a failure state if a failure code is output from the engine control unit, wherein the failure diagnoser executes a command for performing the method of claim 7.

9. A method for diagnosing failure of a gasoline direct injection (GDI) engine, comprising:

verifying whether a failure code is output from an engine control unit that controls the engine; and diagnosing whether a fuel system is in a failure state by forcibly driving the fuel system of the engine with a set control value when the failure code is output from the engine control unit wherein the fuel system includes a fuel pressure sensor, a low-pressure fuel pump, a high-pressure fuel pump and an injector, wherein the diagnosing of whether the fuel system is in the failure state is performed sequentially in an order of the fuel pressure sensor, the low-pressure fuel pump, the high-pressure fuel pump, and the injector, and wherein the diagnosing of whether the fuel system is in the failure state comprises:

diagnosing whether the fuel pressure sensor is in the failure state;

diagnosing whether the low-pressure fuel pump is in the failure state after the diagnosing of whether the fuel pressure sensor is in the failure state;

diagnosing whether the high pressure fuel pump is in the failure state after the diagnosing of whether the low-pressure fuel pump is in the failure state; and diagnosing whether the injector is in the failure state after the diagnosing whether the high pressure fuel pump is in the failure state.

10. A system for diagnosing failure of a gasoline direct injection (GDI) engine, comprising:

an engine control unit (ECU) configured to control the engine;

a low-pressure fuel pump configured to primarily pressurize gasoline fuel of a fuel tank;

a high-pressure fuel pump configured to secondarily pressurize the fuel pressurized by the low-pressure fuel pump;

an injector configured to directly inject the fuel pressurized by the high-pressure fuel pump into a combustion chamber of the engine;

a fuel pressure sensor configured to detect fuel pressures of the low-pressure fuel pump and the high-pressure fuel pump; and a failure diagnoser configured to diagnose whether the fuel pressure sensor, the low-pressure fuel pump, the high-pressure fuel pump, and/or the injector are in a failure state if a failure code is output from the engine control unit, wherein the failure diagnoser executes a command for performing the method of claim 9.

* * * * *